United States Patent [19]

Seki et al.

[11] Patent Number: 5,051,676
[45] Date of Patent: Sep. 24, 1991

[54] ROBOT PROGRAM CHECKING METHOD

[75] Inventors: Masaki Seki, Tokyo; Takeshi Arakaki, Yamanashi, both of Japan

[73] Assignee: Fanuc Ltd., Yamanashi, Japan

[21] Appl. No.: 476,410

[22] PCT Filed: Oct. 4, 1989

[86] PCT No.: PCT/JP89/01018
§ 371 Date: May 30, 1990
§ 102(e) Date: May 30, 1990

[87] PCT Pub. No.: WO90/04222
PCT Pub. Date: Apr. 19, 1990

[30] Foreign Application Priority Data

Oct. 8, 1988 [JP] Japan .................. 63-252891

[51] Int. Cl.5 .................................. G05B 19/42
[52] U.S. Cl. .................. 318/568.24; 318/568.10; 364/513; 364/191; 901/16; 901/17
[58] Field of Search .................. 318/560-636; 364/513, 191, 192; 901/13-23, 3, 9

[56] References Cited

U.S. PATENT DOCUMENTS

| 4,379,335 | 4/1983 | Kirsch et al. | 318/568 |
| 4,511,985 | 4/1985 | Inaba et al. | 318/568 |
| 4,887,222 | 12/1989 | Miyake et al. | 364/513 |

Primary Examiner—Paul Ip
Attorney, Agent, or Firm—Staas & Halsey

[57] ABSTRACT

A robot program checking method for editing a robot program accurately and rapidly. When types of a controller and a robot body to which an edit program is to be applied are specified after the edit program is created, a format table indicative of a format suitable for the controller and movable range data for an operating section of the robot body are transferred from a floppy disk to a working memory together with the edit program. If the edit program which is read out one block by one block is not stated in accordance with a predetermined format, or if a position data contained in the edit program and indicative of a target moving position of the operating section of the robot body falls outside the movable range, an error message indicative of a block number and a reason for the error are printed out. With reference to the error message, an operator corrects the edit program.

5 Claims, 3 Drawing Sheets

ROBOT PROGRAM CHECKING METHOD

BACKGROUND OF THE INVENTION

1. Technical Field

The present invention relates to robot programming, and more particularly, to a method of checking quality of an edit program created by editing a robot program.

2. Background Art

It is conventionally known to create an operation program for robot control by performing teaching, namely, by operating a teaching pendant in such a manner that a tool mounted to a robot arm is located at a desired position on a predetermined moving path and assumes a desired orientation, and that desired construct elements (instruction statement, etc.) of programming language are inputted into a controller of the robot. In this case, the controller automatically creates an operation program on the basis of joint angles detected by internal measuring sensors and language construct elements manually inputted through the teaching pendant. Another method is also known, in which an operation program is created offline by using a computer other than the controller of the robot.

The operation program thus prepared is subjected to edition, where required. In the program edition, an operator modifies target tool position and orientation, for instance, in accordance with a format suitable for a robot to which the edit program is to be applied. More specifically, the operator operates a keyboard to sequentially inputs character columns, etc., which respectively correspond to desired data and desired language construct elements. During this keyboard entry, various inputs errors are liable to occur in addition to simple errors in operating the keyboard. Particularly, when plural types of controllers are combined with plural types of robot bodies in various manners to produce various robots, wherein a movable range of a movable section such as a tool of each robot (hereinafter referred to as the movable range of the robot body) varies depending upon the type of the robot body and the format to be applied to a controller also varies depending upon the type of the controller, an operator often misunderstands the types of the robot body and controller of a robot to which an edit program is to be applied. In such a case, position data falling outside the movable range of the robot body may be erroneously inputted, or a format unsuitable for the controller may be erroneously employed. Usually, however, the aforementioned errors in editing a program are found only after the robot is actually operated. This requires labor correcting the robot program.

SUMMARY OF THE INVENTION

An object of the present invention is to provide a robot program checking method which permits accurate and rapid edition of a robot program.

In order to achieve the above-mentioned object, a robot program checking method of the present invention includes the steps of: (a) storing beforehand a format suitable for a controller; (b) storing beforehand a movable range of an operating section of a robot body; (c) reading out an edit program; (d) determining whether or not the thus read edit program is stated in accordance with a format suitable for a controller of a robot to which the edit program is to be applied; (e) when the read block contains data indicative of a target operating position of an operating section of a robot body, determining whether or not the data falls within a movable range of an operating section of a robot body of the robot to which the edit program is to be applied; and (f) generating an alarm when either one of results of the determination in the steps (d) and (e) indicate the format of the edit program is not suitable for the controller to which the edit program is to be applied, or the position data contained in the edit program falls outside the movable range of the robot body. Accordingly, an error in editing the program can be found without the need of actually operating the robot, so that the edit program can be accurately and rapidly prepared.

DESCRIPTION OF THE PREFERRED EMBODIMENTS

Figure 3:
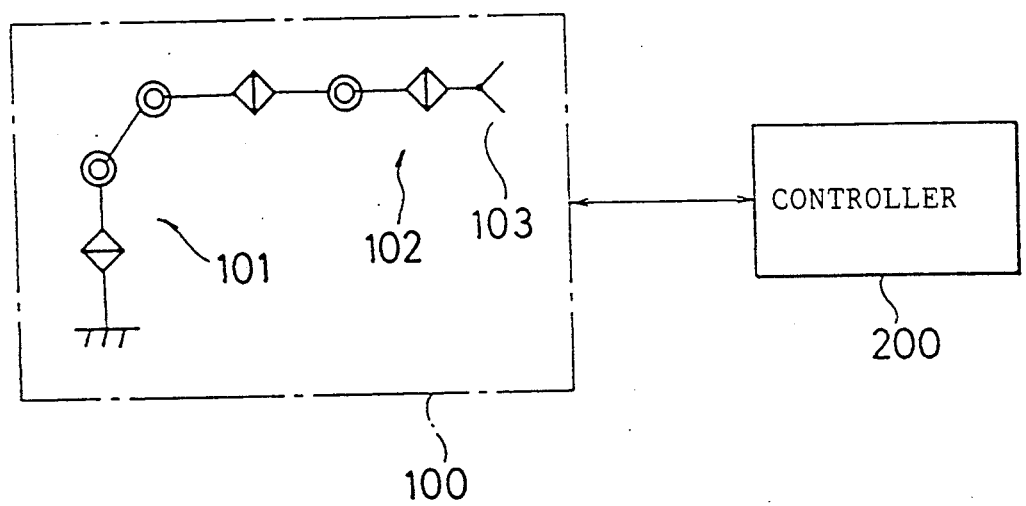
FIG. 3. is a view showing, by way of example, a robot to which the method of FIG. 1 is applied.

A robot to which a method of the present invention is applied is preferably composed of one of plural types of robot bodies and one of plural types of controllers. These robot bodies and controllers are respectively prepared beforehand, and each robot body is suited to a controller. As shown by way of example, in FIG. 3, the robot body 100 includes an arm assembly 101 and a wrist assembly 102. These assemblies are composed of links which serve as an operating section of the robot body under the control of a controller 200, and adjacent ones of the links are coupled to each other through an associated joint. Further, an end-effector 103 is mounted to the wrist assembly.

Figure 1:
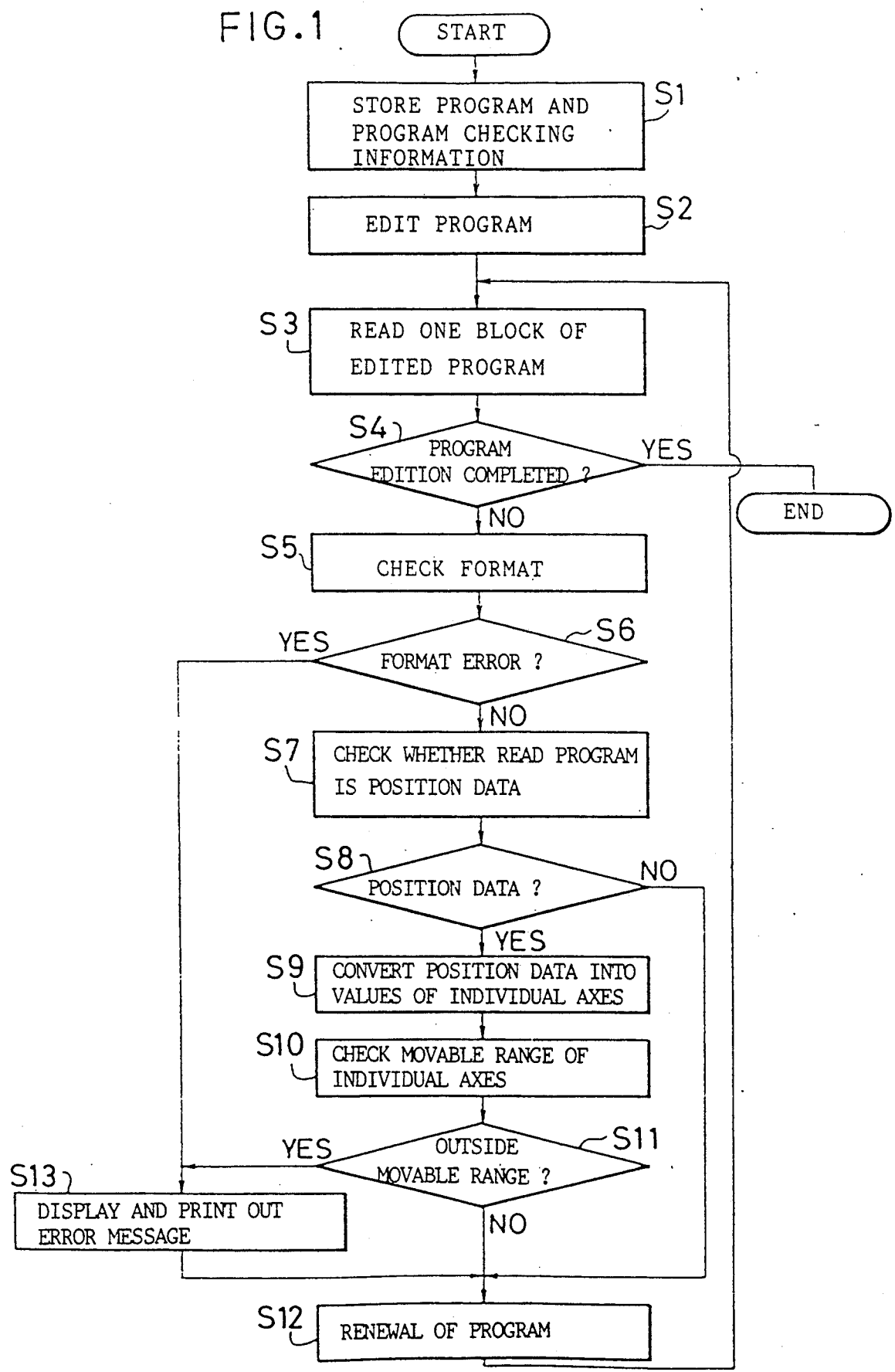
FIG. 1 is a flowchart showing a robot program checking method according to an embodiment of the present invention.
Figure 2:
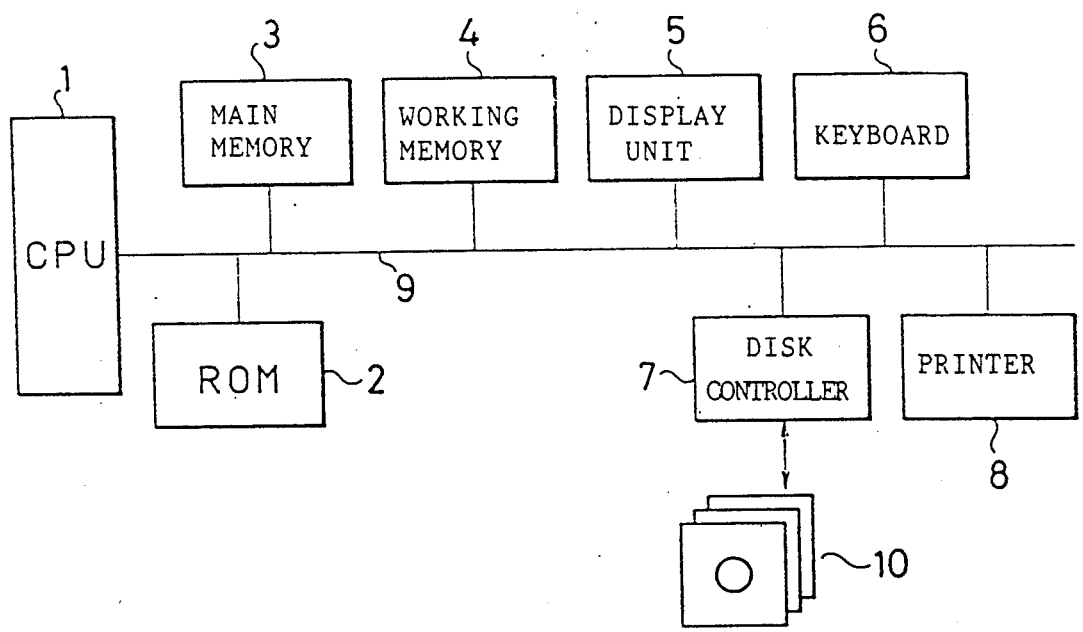
FIG. 2 is a schematic block diagram showing a part of a programming apparatus embodying the method of FIG. 1.

Referring to FIG. 2, an offline programming apparatus embodying a method according to an embodiment of the present invention includes a central processing unit (hereinafter referred to as CPU) 1, a ROM 2 storing therein a control program for program checking process (mentioned later with reference to FIG. 1), a main memory 3 having of a RAM for storing a robot program to be edited, etc., and a working memory 4 having of a RAM for program edition. The above-mentioned elements 2–4 as well as a graphic display unit 5, a keyboard 6, a disk controller 7, and a printer 8 are connected to the CPU 1 through busses 9. The disk controller 7 is so arranged that a floppy disk 10 for storing a robot program and various information for program checking process can be mounted to and dismounted from the controller.

The robot program, which is created offline, for instance, generally includes a plurality of blocks each having a group of program statements each of which starts with a start symbol and ends with an end symbol. Some blocks include data (hereinafter referred to as position data) indicative of target position and orientation of the end-effector 103 of the robot body 100 and represented by a reference coordinate system set for the robot body. The above-mentioned checking process information includes formats respectively suitable for various controllers, such as format information indicative of code forms executable by the controllers. The checking process information for respective types of controllers is stored in the floppy disk 10 in the form of a look-up table (hereinafter, the format information is referred to as format table). The checking process information further includes data (hereinafter referred to as conversion data) for conversion from each of the reference coordinate systems respectively set for various robot bodies into each of link coordinate systems respectively set for the links of each robot body, and for inverse conversion from each link coordinate system into the associated one reference coordinate system, and data (hereinafter referred to as movable range data) indicative of movable ranges of individual axes of each robot body. These data for respective types of robot bodies are stored in the disk 10.

In the following, programs (1) to (3) for input of rectangular coordinate for positioning control, input of axis for positioning control, and input of axis for rectilinear positioning control are shown by way of example. These programs are stated with the use of format suitable for a certain robot controller.

F88%
$\quad$ G97X155.35Y-1560.56Z42.36P50.0Q0.0R15.0BE $\quad$ (1)

F15%T-10.0W-12.0U-13.99C-16.0B-18.0A2.0BE $\quad$ (2)

F0650CT15.0W-20.0U23.0C0.55B0.66A0.76BE $\quad$ (3)

Further, another set of programs (1') to (3') for the aforesaid three kinds of input are shown hereinbelow for example, which are stated with the use of a different format suitable for a different robot controller.

G00G97F8X15535Y-156055Z1923P5000Q0R1500S00 $\quad$ (1')

G00F5T-973W1123U-179B-2984A-522S00 $\quad$ (2')

G01F0108T1499W1203U3973C1799B1607A-1786S00 $\quad$ (3')

With reference to FIG. 1, operation of the aforementioned programming apparatus will be explained.

At first, an operator inserts the floppy disk 10, which stores therein robot programs, etc., into the disk controller 7, and then operates the keyboard 6 so as to input a command to read a robot program to be edited, and so as to specify the type of the robot body 100 and the type of the controller 200. In response to this, the CPU 1 transfers the program to be edited as well as the information for the program checking process (i.e., the format table corresponding to the specified type of controller, and the conversion data and the movable range data respectively corresponding to the specified type of robot body) from the floppy disk 10 to the main memory 3 through the disk controller 7, and causes the program and the data to be stored in the main memory (step S1).

Next, when the operator operates the keyboard 6 so that the programming apparatus is caused to operate in a program editing mode, the CPU 1 transfers the program stored in the main memory 3 to the working memory 4, causes the thus transferred program to be stored in the working memory, and causes the graphic display unit 5 to display this program on its screen. Then, with reference to the displayed contents, the operator operates the keyboard 6 so as to edit the program offline (step S2). For instance, a position data is corrected, or a new block including a group of program statements is inserted.

When the operator inputs an edition end command through the keyboard 6 after completion of the program edition, the CPU 1 reads out a first block of the thus edited program (step S3), and determines whether or not a program end command is contained in the same block (step S4). Here, the first block is read out at the step S3, and accordingly, the determination result at the step S4 becomes negative. Thus, step S5 is entered, wherein the CPU compares a code form, by which a program statement contained in the first block is described, with the code form contained in the format table stored in the main memory 3, to thereby check whether or not the same program statement is stated with the use of the predetermined format, and stores the check result. For instance, the CPU causes a predetermined register to store a flag information indicative of the check result. Whereupon, on the basis of the check result, the CPU determines the presence/absence of a format error (step S6). If no format error is present, then the CPU checks whether or not a position data is stated in the program statement contained in the first block which is read out at the step S3, and stores the check result (step S7).

If it is determined at step S8 that no position data is included in the first block of the program, the CPU 1 rewrites the first block of the robot program stored in the main memory 3 as the program to be edited into the first block read out at the step S3, to thereby renew the robot program (step S12), and then returns to the step S3. On the other hand, if it is determined at the step S8 that a position data is included, step S9 is entered. Namely, by using the conversion data stored in the main memory 3, the CPU 1 converts the position data represented by the reference coordinate system into target moving positions (e.g., target joint angles), respectively represented by the link coordinate systems, of the robot operating sections respectively associated with the robot axes. Next, the CPU compares each of the target moving positions with a corresponding one of the movable range data stored in the main memory 3, to check whether or not the target moving position falls outside the movable range, and stores the check result (step S10). If it is determined at step S11 that all of the target moving positions fall within the movable ranges, respectively, the CPU performs renewal of the program (step S12). Whereupon, the CPU returns to the step S3, so as to execute the aforesaid checking process for a second block of the robot program. The same process is also executed for a third block and subsequent blocks.

During the checking process for a certain block of the edited program, if the presence of a format error is determined at the step S6, or if position data, which falls outside an associated movable range, being stated in the program is determined at the step S11, the CPU 1 causes the graphic display unit 5 to display an error message indicating the block number of the same block and the content of edition error (format error or defective position data) on its screen, and drives the printer 8 so that a similar error message is printed out (step S13). Then, after completion of renewal of the program at the step S12, the checking process for the next block is entered.

Thereafter, the presence of a program end command in a block read out at the step S3 is determined at the step S4, so that the program checking process of FIG. 1 is completed.

When the operation of the programming apparatus is switched again to its program editing mode by the keyboard operation, the program which is renewed as mentioned above and stored in the main memory 3 is written into the working memory 4, and is displayed on the screen of the graphic display unit 5 (steps S1 and S2 of FIG. 1). With reference to the error message previously printed out and indicating the block number at which the error occurs and the reason for the error, the operator makes required correction of the program, and then inputs a program edition end command. In response to this, the CPU 1 executes the program check/renewal process which corresponds to the step S3 and the subsequent steps of FIG. 1. The aforementioned program edition and program check/renewal process is repeatedly carried out until the error message is not displayed. As a result, the edit program for robot operation, free from error, is created.

The present invention is not limited to the foregoing embodiment, and may be modified in various manners.

For instance, the foregoing embodiment is so arranged as to effect program renewal even for a block which contains an error. Alternatively, with this program renewal and the print-out of error message omitted, the block number specifying a block which contains an error, program statements constituting the same block, and an error message may be stored in the working memory 4, and, at the same time, may be displayed on the screen of the graphic display unit 5. In this case, the operator corrects the program with reference to the displayed message.

Although, in the foregoing embodiment, the edited program is stored in the main memory each time the correction of the edit program is completed, the program may be stored in the main memory or in an external memory only when the preparation of the edit program free from error is completed. In this case, it is required to execute processing, which includes various steps of FIG. 1 except for the program renewal step S12, and a step for determining whether or not a program re-edit command or a program checking end command is inputted, which step should be newly provided subsequent to the process and determination step S4. Further, it is necessary to design the programming apparatus in such a manner that the same apparatus can operate in an edit mode when the program re-edit command is inputted by the operator, and can execute the step S3 and the subsequent steps when the program edit end command, explained with reference to FIG. 1, is inputted. Moreover, the edit program, free from error, stored in the working memory 4 should be stored in the main memory or the external memory, when the operator determines that the preparation of the edit program free from error is completed, and then inputs the program checking end command.

We claim:

1. A robot program checking method, comprising the steps of:
    (a) storing beforehand a format suitable for a controller of the robot;
    (b) storing beforehand a movable range of an operating section of a body of the robot;
    (c) reading out an edit program;
    (d) determining whether or not the thus read edit program is stated in accordance with the format suitable for the controller of the robot to which said edit program is to be applied;
    (e) when a read block contains data indicative of a target operating position of the operating section of the robot body, determining whether or not said data falls within the movable range of the operating section of the robot body of the robot to which said edit program is to be applied; and
    (f) generating an alarm when results of determination in said steps (d) and (e) indicate that the format of the edit program is not suitable for the controller to which the edit program is to be applied, or the position data contained in the edit program falls outside the movable range of the robot body.

2. A robot program checking method according to claim 1, further comprising the steps of:
    storing formats respectively suitable for plural types of controllers, in said step (a), so that each format corresponds to one of the plural types of controllers;
    storing movable ranges for plural types of robot bodies, in said step (b), so that each movable range corresponds to one of the plural types of robot bodies; and
    inputting information beforehand, said information being indicative of the controller and the robot body to which said edit program is to be applied.

3. A robot program checking method according to claim 2, wherein said steps (d) and (e) are executed with reference to said information inputted beforehand and indicative of each of the plural types of robot bodies and controllers.

4. A robot program checking method according to claim 1, wherein said edit program comprises a plurality of blocks, and said edit program is read out one block by one block in said step (c).

5. A robot program checking method according to claim 4, further comprising the:
    a step of storing a robot program from which said edit program is created;
    wherein said steps (d) and (e) are executed for each block of said edit program, and a corresponding part of said robot program is renewed when both of the results of determination at said steps (d) and (e) are affirmative.

* * * * *